United States Patent
Sohn et al.

(10) Patent No.: US 8,015,871 B2
(45) Date of Patent: Sep. 13, 2011

(54) SENDER UNIT FOR SENSING THE LEVEL OF REMAINING FUEL IN A FUEL TANK UTILIZING A NON-CONTACTING SENSOR

(75) Inventors: In-Seok Sohn, Chungcheongbuk-do (KR); Kyeong-Hwan Kim, Daejeon (KR); Mun-Sik Jeon, Chungcheongbuk-do (KR); Hyung-Min Kim, Daejeon (KR)

(73) Assignee: Coavis, Chungcheongnam-Do (KR)

( * ) Notice: Subject to any disclaimer, the term of this patent is extended or adjusted under 35 U.S.C. 154(b) by 530 days.

(21) Appl. No.: 11/916,735

(22) PCT Filed: Jun. 7, 2006

(86) PCT No.: PCT/KR2006/002182
§ 371 (c)(1),
(2), (4) Date: Dec. 6, 2007

(87) PCT Pub. No.: WO2006/132496
PCT Pub. Date: Dec. 14, 2006

(65) Prior Publication Data
US 2008/0202231 A1 Aug. 28, 2008

(30) Foreign Application Priority Data
Jun. 8, 2005 (KR) .................. 10-2005-0048707

(51) Int. Cl.
*G01F 23/00* (2006.01)
*G01F 23/32* (2006.01)
*G08B 21/00* (2006.01)

(52) U.S. Cl. ............... 73/313; 73/317; 340/625

(58) Field of Classification Search ........... 73/313, 73/317; 340/623, 625
See application file for complete search history.

(56) References Cited

U.S. PATENT DOCUMENTS
5,332,965 A * 7/1994 Wolf et al. ............... 324/207.12
(Continued)

FOREIGN PATENT DOCUMENTS
JP 8 94413 4/1996
(Continued)

OTHER PUBLICATIONS
English language Abstract of JP 2001-356040.
(Continued)

*Primary Examiner* — Hezron Williams
*Assistant Examiner* — Nathaniel Kolb
(74) *Attorney, Agent, or Firm* — Greenblum & Bernstein P.L.C.

(57) ABSTRACT

The present invention relates to a sender unit for sensing the level of remaining fuel in a fuel tank utilizing a non-contacting sensor. The sender unit for sensing the level of remaining fuel in a fuel tank of a vehicle is fixed in the fuel tank to sense the level of the remaining fuel by detecting the position of a float that floats depending on the level of the liquid surface of the fuel. The sender unit includes a casing; a disk-shaped rotor yoke pivotably received in the casing; a ring-shaped magnet fixed to a lower portion of the rotor yoke; a stator yoke that is a magnetic body including a plurality of horizontal arms spaced apart from a lower surface of the magnet so as to form a closed magnetic circuit together with the magnet; a magnetic sensing element fixed within a gap formed in the stator yoke; a plate which is fixedly received in the casing and to which the stator yoke is fixed; and a rod having one side end connected to the float and the other side end penetrating through the casing and fixed to the rotor yoke. According to the present invention, it is possible to accurately sense the level of fuel remaining in a fuel tank in a non-contacting manner, thereby improving the durability of the device.

3 Claims, 4 Drawing Sheets

U.S. PATENT DOCUMENTS

| | | | |
|---|---|---|---|
| 6,310,473 B1 * | 10/2001 | Zhao | 324/207.25 |
| 6,483,296 B1 | 11/2002 | Hamaoka et al. | |
| 6,518,753 B1 * | 2/2003 | Apel et al. | 324/207.25 |
| 6,945,108 B2 | 9/2005 | Kim et al. | |
| 2004/0003660 A1 * | 1/2004 | Fukuhara et al. | 73/319 |

FOREIGN PATENT DOCUMENTS

| | | |
|---|---|---|
| JP | 2001-356040 | 12/2001 |
| JP | 2001 356040 | 12/2001 |
| JP | 2002-206946 | 7/2002 |
| JP | 2002-206947 | 7/2002 |
| JP | 2002-206959 | 7/2002 |
| JP | 2004-212305 | 7/2004 |

OTHER PUBLICATIONS

English language Abstract of JP 8-94413.

* cited by examiner

【Figure 1】
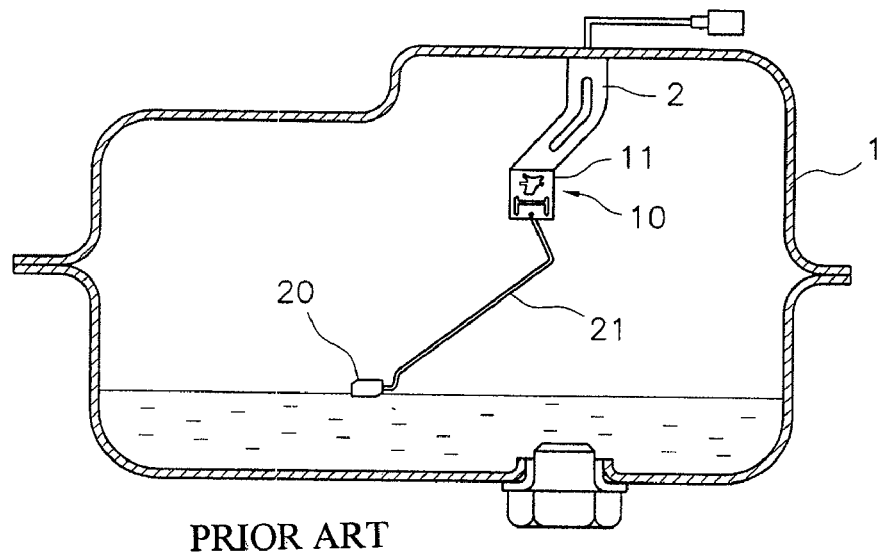
PRIOR ART
【Figure 2】
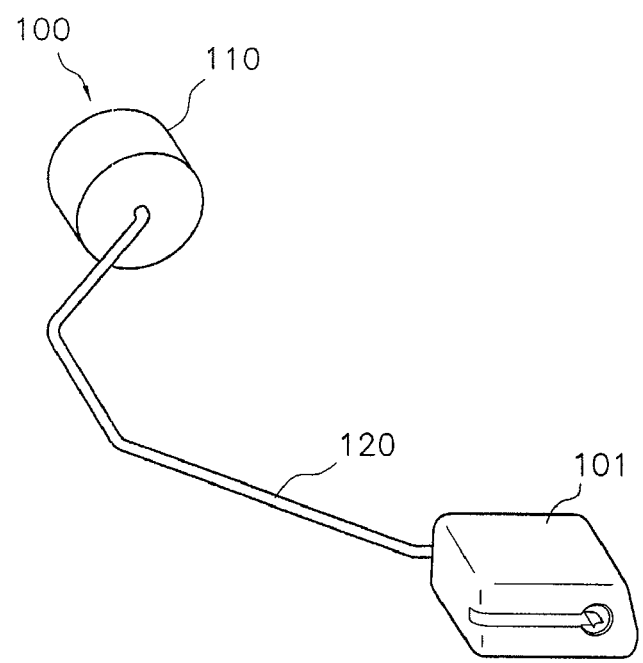

[Fig. 3]
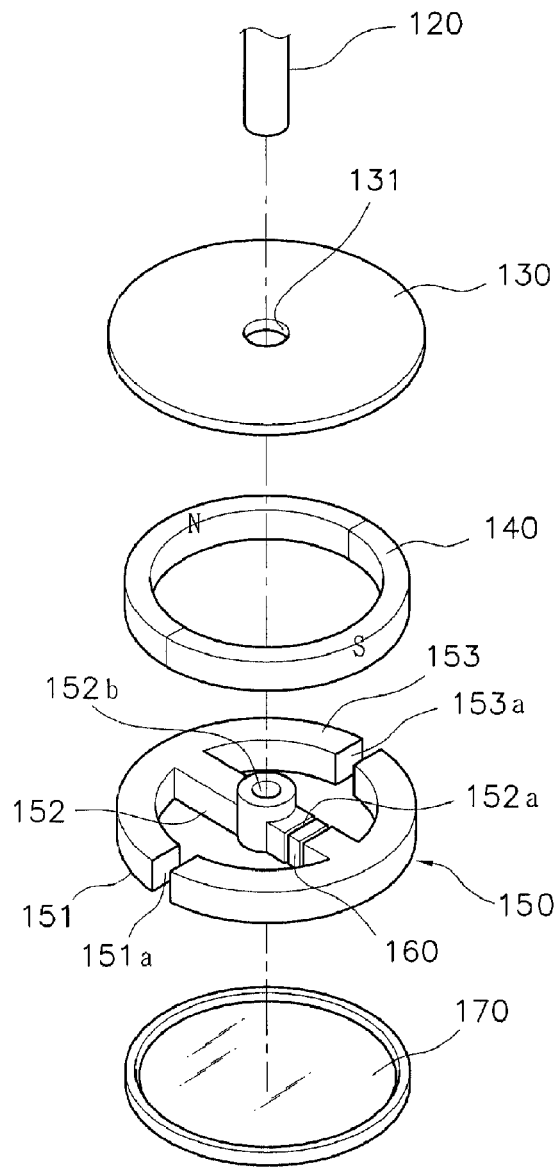
[Fig. 4]
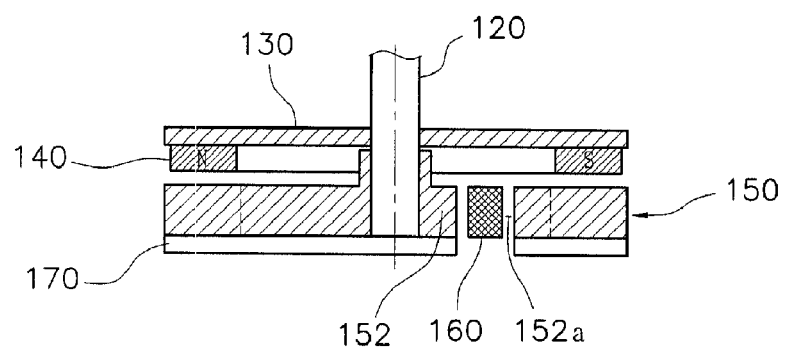

[Fig. 5]
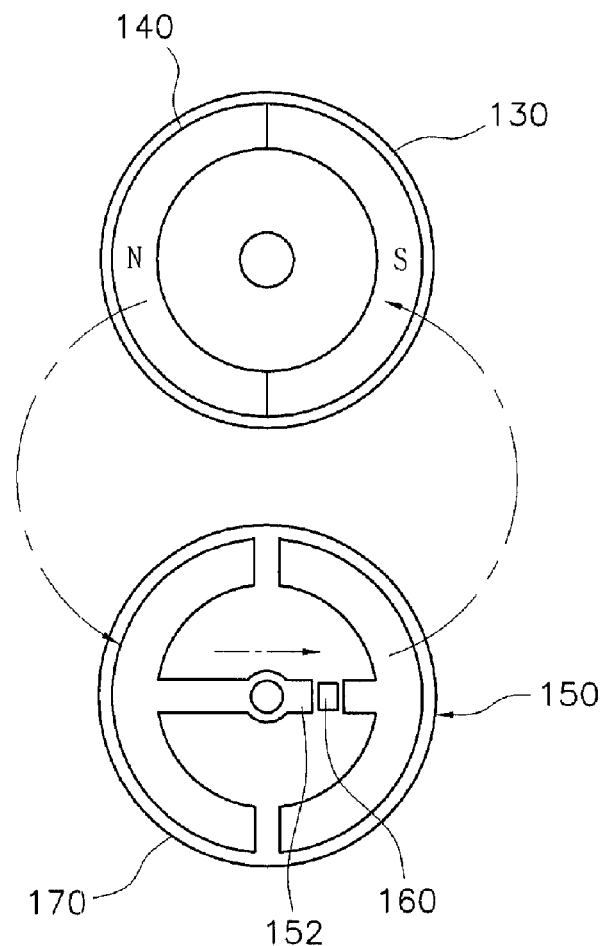
[Fig. 6]
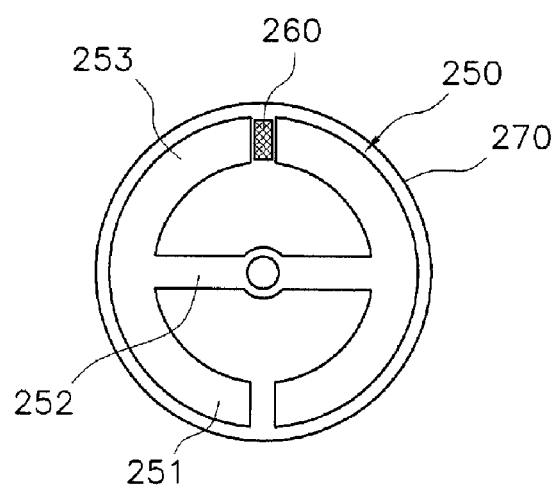

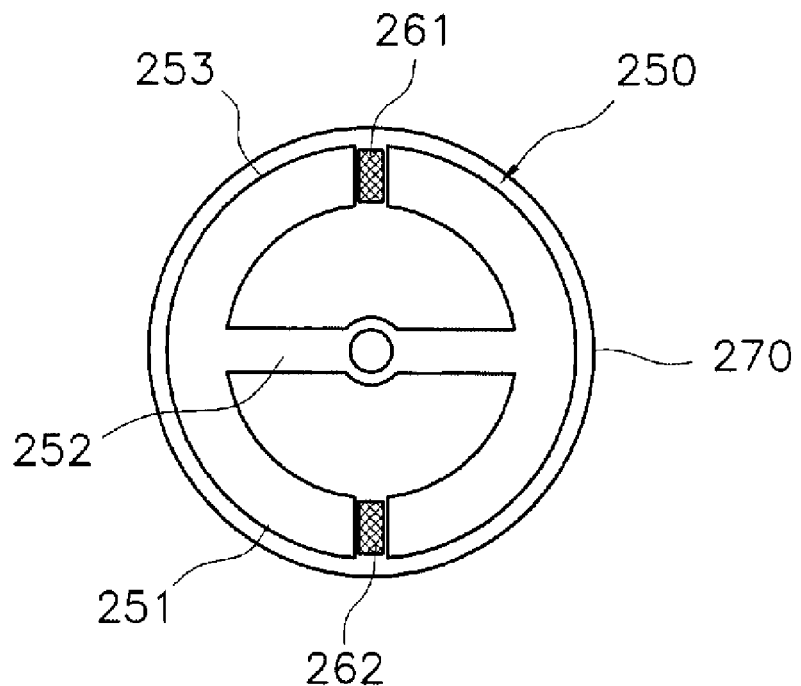
[Fig. 7]

SENDER UNIT FOR SENSING THE LEVEL OF REMAINING FUEL IN A FUEL TANK UTILIZING A NON-CONTACTING SENSOR

TECHNICAL FIELD

The present invention relates to a sender unit for sensing the level of remaining fuel in a fuel tank utilizing a non-contacting sensor, and more particularly, to a sender unit for sensing the level of remaining fuel in a fuel tank utilizing a non-contacting sensor, which can improve the efficiency of a manufacturing process and can be miniaturized.

BACKGROUND ART

Generally, a gauge capable of indicating the level of fuel stored in a fuel tank is provided on an instrument panel positioned in front of a driver's seat of a vehicle, and a sender unit capable of sensing the level of the fuel is installed in the fuel tank, so that a signal corresponding to the level of the fuel sensed by the sender unit can be transmitted to the gauge to inform the level of the fuel remaining in the fuel tank.

FIG. 1 is a view showing a conventional device for sensing the level of remaining fuel, which is installed in a fuel tank of a vehicle. A sender unit 10, and a casing 11 of the sender unit 10, is fixed to a guide member 2 fixed to an upper end of the interior of a fuel tank 1, and has a pivotable wire arm 21 with a float 20 fixed to one end thereof.

The float 20 moves upward or downward by its buoyancy depending on the level of the fuel, and the upward or downward movement of the float 20 is converted into a rotational movement of the wire arm 21.

Meanwhile, in the sender unit 10 to which the wire arm 21 is pivotably coupled through a hinge is provided a variable resistor of which the resistance value varies depending on the rotation of the wire arm 21. Depending on variations in the resistance value of the variable resistor, a signal is transmitted to a fuel gauge on the instrument panel to indicate the level of fuel remaining in the fuel tank.

As described above, the conventional sender unit that is a contact type using the variable resistor has been widely used. In addition to such a contact type sender unit, there are non-contact type sender units such as those using a Hall element, a magnetic force type, and an encoding type with an encryption plate.

However, in the contact type sender unit described above, the operation for sensing the level of fuel is performed by means of rotation of the wire arm connected to a movable contact which is brought into electrical contact with a resistance track formed on a PCB or ceramic substrate.

That is, since the level of fuel is detected depending on the degree of relative rotation of the movable contact on the resistance track in the conventional contact type sender unit, there are many problems associated with deterioration of a durable lifetime and linearity of an output value due to brush abrasion or poor resistance, i.e., limitations on the accuracy of measurement, and the like.

On the other hand, the non-contact type sender unit has superior properties in view of durability and accuracy contrary to the contact type sender unit. However, there are problems in that precise processing operations are required and manufacturing costs are high. Specifically, in case of a non-contact type magnetic position sensor, there is considerable difficulty in manufacturing it in a smaller size, and there is a problem in that an operation for laminating silicon steel sheets, which are used for reducing loss due to an eddy current, should be involved, resulting in reduced processing efficiency.

DISCLOSURE OF INVENTION

Technical Problem

The present invention is conceived to solve the aforementioned problems. Accordingly, an object of the present invention is to provide a sender unit for sensing the level of remaining fuel in a fuel tank utilizing a non-contacting sensor, which is mounted within the fuel tank to sense the level of fuel therein and can be miniaturized as a slim type to improve the efficiency of a manufacturing process.

Technical Solution

A sender unit for sensing the level of remaining fuel in a fuel tank of a vehicle according to the present invention is fixed in the fuel tank to sense the level of the remaining fuel by detecting the position of a float that floats depending on the level of the liquid surface of the fuel. The sender unit comprises a casing; a disk-shaped rotor yoke pivotably received in the casing; a ring-shaped magnet fixed to a lower portion of the rotor yoke; a stator yoke that is a magnetic body including a plurality of horizontal arms which are spaced apart from a lower surface of the magnet so as to form a closed magnetic circuit together with the magnet and of which at least one is formed with a gap; a magnetic sensing element fixed within the gap formed in the stator yoke; a plate which is fixedly received in the casing and to which the stator yoke is fixed; and a rod having one side end connected to the float and the other side end penetrating through the casing and fixed to the rotor yoke.

BRIEF DESCRIPTION OF THE DRAWINGS

FIG. 1 is a view showing a conventional device for sensing the level of remaining fuel, which is installed in a fuel tank of a vehicle.

FIG. 2 is a view showing an appearance of a device for sensing the level of remaining fuel in a fuel tank according to the present invention.

FIG. 3 is an exploded perspective view of a sender unit for sensing the level of remaining fuel in a fuel tank according to the present invention.

FIG. 4 is a sectional view of the sender unit for sensing the level of remaining fuel in a fuel tank according to the present invention.

FIG. 5 is a view showing a magnetic path between a magnet and a stator yoke, illustrating an example of the operation of the sender unit for sensing the level of remaining fuel in a fuel tank according to the present invention.

FIGS. 6 and 7 are views showing other embodiments of the stator yoke in the present invention.

BEST MODE FOR CARRYING OUT THE INVENTION

Hereinafter, embodiments of the present invention will be described in detail with reference to the accompanying drawings.

Referring to FIG. 2, a non-contact type sender unit is protected by a casing 110 and is connected to a float 101 through a rod 120 outside the casing 110. Although not shown in the figure, the casing 110 may be provided with a fixing bracket or a fixing member by which the casing can be securely fixed in a fuel tank.

It is sufficient that the configuration or structure of the casing 110 is a sealed structure for preventing fuel from being introduced into the device, and the configuration may be variously modified within the scope of the present invention for achieving the object.

FIG. 3 is an exploded perspective view of a sender unit for sensing the level of remaining fuel in a fuel tank according to the present invention, wherein a casing for protecting the entire device is not shown.

Referring to FIGS. 3 and 4, the sender unit according to an embodiment of the present invention comprises a casing (not shown) for accommodating the entire device; a disk-shaped rotor yoke 130 pivotably received in the casing; a ring-shaped magnet 140 fixed to a lower portion of the rotor yoke 130; a stator yoke 150 that is a magnetic body including a plurality of horizontal arms spaced apart from a lower surface of the magnet 140 so as to form a closed magnetic circuit together with the magnet; a magnetic sensing element 160 fixed within a gap formed in the stator yoke 150; a plate 170 which is fixedly received in the casing and to which the stator yoke 150 is fixed; and a rod 120 having one side end connected to the float and the other side end penetrating through the casing and fixed to the rotor yoke 130.

At the center of the rotor yoke 130 is formed a shaft hole 131 into the rod 120 is press-fitted so that the rotor yoke 130 can be integrally rotated according to the rotation of the rod 120.

The magnet 140 is fixed to the lower surface of the rotor yoke 130 and may be a ring-shaped permanent magnet or the like.

The stator yoke 150 is a magnetic body that is horizontally placed to be spaced apart by a predetermined distance from the lower surface of the magnet 140 so as to form a closed magnetic circuit together with the magnet 140.

Specifically, the stator yoke 150 in the present invention is characterized by being made into a single-layered core out of metallic powder, leading to advantages in that loss due to an eddy current can be reduced and the stator yoke can be miniaturized as a slim type with a certain thickness.

The stator yoke 150 comprises first, second and third arms 151, 152 and 153 which are connected in a diametric direction to define a ring shape. There are gaps 151a, 152a and 153a in the first, the second and the third arms 151, 152 and 153, respectively. A magnetic sensing element is positioned within one of the gaps. The gaps are not necessarily formed in the respective arms, and it is sufficient to provide at least one gap so that the magnetic sensing element can be positioned in any one of the first, second and third arms. Referring to FIG. 3, it is shown that the magnetic sensing element 160 is fixed within the gap 152a formed in the second arm 152.

At the center of the second arm 152 is formed a hinge hole 152b into which an end of the rod 120 is inserted.

The stator yoke 150 in the embodiment of the present invention may be separately manufactured as two parts by forming the gaps 151a, 152a and 153a in the first, second and third arms 151, 152 and 153, respectively. However, in order to facilitate the manufacture thereof, the stator yoke may be manufactured as a single piece in the form of a core.

Referring to FIGS. 6 and 7 showing a specific embodiment, first and third arms 251 and 253 are provided with gaps, respectively, while a second arm 252 is formed as a continuous body without an additional gap so that a magnetic sensing element 260 can be provided in only one of the first and third arms 251 and 253, as shown in FIG. 6.

Since such a stator yoke 250 can be integrally constructed to be manufactured with only one set of molds, it can be easily manufactured and the efficiency of a manufacturing process thereof can be improved.

Meanwhile, as shown in FIG. 7, two magnetic sensing elements 261 and 262 are mounted within both the gaps of the first and third arms 251 and 253 so that a rotational angle of the rotor yoke can be determined from the Hall electromotive forces detected by the magnetic sensing elements 261 and 262, thereby improving data reliability.

Then, a Hall element is used as the magnetic sensing element 160 in the present invention and is positioned within the gap formed in the arm to detect the Hall electromotive force generated by a magnetic field, and a signal is transmitted to a control unit or a gauge through a terminal (not shown) connected to the Hall element.

The plate 170 fixes the stator yoke 150 thereto and is fixedly received in the casing.

Hereinafter, the operational relationship of the sender unit according to the embodiment of the present invention constructed as above will be described.

FIG. 5 is a view showing a magnetic path between the magnet and the stator yoke, illustrating an example of the operation of the sender unit for sensing the level of remaining fuel in a fuel tank according to the present invention, wherein a direction designated by an arrow indicates a magnetic path along which a magnetic field generated by the magnet 140 is fed back to the magnet 140 through the stator yoke 150.

Meanwhile, the magnetic sensing element 160 is positioned within the gap of the second arm 152 so as to detect the Hall electromotive force generated by the magnetic field within the gap of the second arm 152. At this time, the Hall electromotive force detected by the magnetic sensing element 160 varies according to a relative position between the magnet 140, which is fixed to the rotor yoke 130 to generate the magnetic field, and the stator yoke 150.

That is, the magnet 140 fixed to the rotor yoke 130 is rotated depending on the level of the float 101 provided in the fuel tank, and the Hall electromotive force detected by the magnetic sensing element 160 of which the position is fixed together with the stator yoke 150 varies depending on the rotational amount of the magnet 140, so that the level of fuel remaining in the fuel tank can be determined by detecting a variation in the Hall electromotive force.

INDUSTRIAL APPLICABILITY

The sender unit for sensing the level of remaining fuel in a fuel tank utilizing a non-contacting sensor according to the present invention described above uses a magnetic circuit to sense the level of fuel remaining in the fuel tank in a non-contacting manner, so that it is possible to accurately the level of remaining fuel and to improve the durability of the device. Further, since the stator yoke which constitutes the magnetic circuit in the present invention is made through metal molding out of metallic powder, the stator yoke may be manufactured as a slim type with a reduced thickness as compared with a conventional one, thereby obtaining an advantage of miniaturization of a product.

The invention claimed is:

1. A sender unit for sensing the level of remaining fuel in a fuel tank of a vehicle, the sender unit being fixable within the fuel tank to sense the level of the remaining fuel by detecting the position of a float that floats depending on the level of the liquid surface of the fuel, the sender unit comprising:

a casing;

a disk-shaped rotor yoke pivotably received in the casing;

a ring-shaped magnet fixed to a lower portion of the rotor yoke;

a stator yoke that is a magnetic body comprising two ring shaped arms and a center arm horizontally crossing a center defined by the two ring shaped arms, the stator yoke being spaced apart from a lower surface of the magnet so as to form a closed magnetic circuit together with the magnet, the center arm being formed with a gap;

a magnetic sensing element fixed within the gap formed in the center arm of the stator yoke;

a plate which is fixedly received in the casing and to which the stator yoke is fixed; and a rod having one side end connected to the float and the other side end penetrating through the casing and fixed to the rotor yoke, wherein the ring shaped magnet is fixed to a planar surface of the rotor yoke such that a planar surface of the ring shaped magnet opposes a planar surface of the stator yoke.

2. The sender unit as claimed in claim 1, wherein the magnetic sensing element is a Hall element.

3. The sender unit as claimed in claim 1, wherein the stator yoke is a single-layered core made of metallic powder.

* * * * *